Aug. 22, 1950 J. R. HOBBS 2,519,761
POTATO DIGGER
Filed Feb. 19, 1947 2 Sheets-Sheet 1

Inventor
John R. Hobbs

By Clarence A. O'Brien
and Harvey B. Jacobson
Attorneys

Aug. 22, 1950   J. R. HOBBS   2,519,761
POTATO DIGGER
Filed Feb. 19, 1947   2 Sheets-Sheet 2
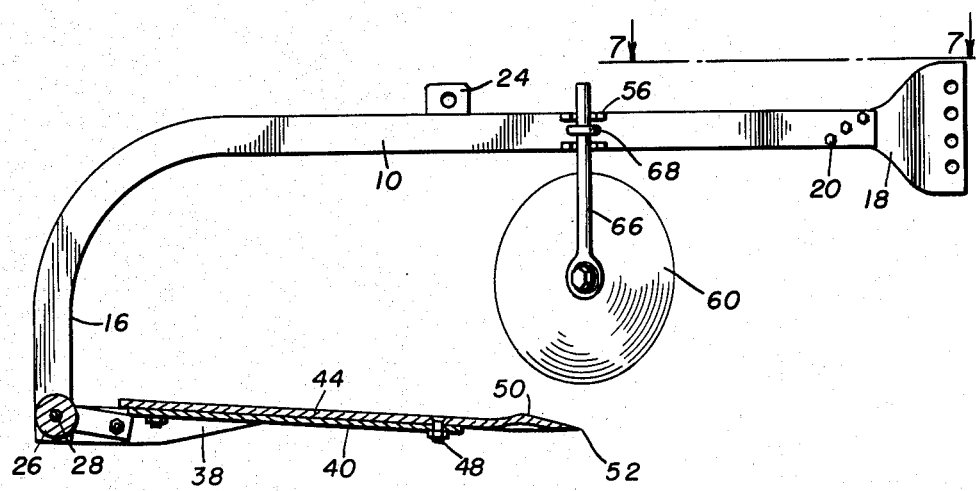
Fig. 2.
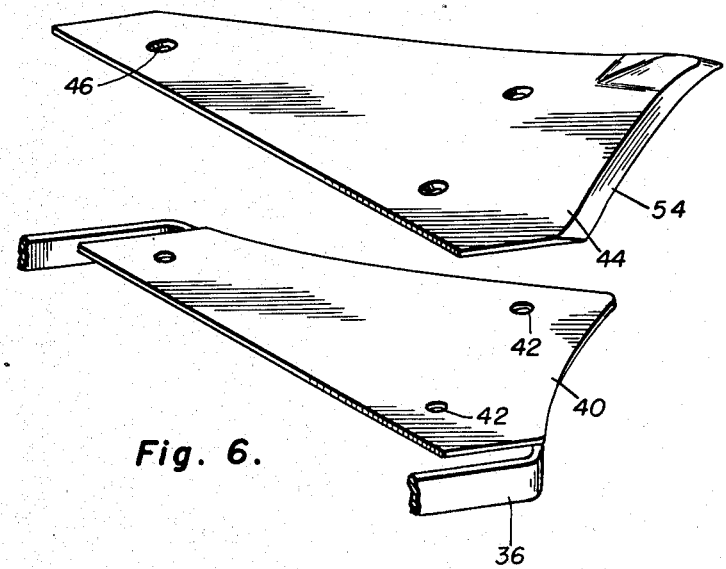
Fig. 5.
Fig. 6.
Fig. 7.
Inventor
John R. Hobbs
By Clarence A. O'Brien
and Harvey B. Jacobson
Attorneys Patented Aug. 22, 1950

2,519,761

UNITED STATES PATENT OFFICE 2,519,761

POTATO DIGGER

John R. Hobbs, Ben Wheeler, Tex.

Application February 19, 1947, Serial No. 729,475

2 Claims. (Cl. 55—9)

This invention relates generally to agricultural digging machines, and more particularly to a digger adapted for use in digging sweet potatoes, other types of potatoes, peanuts and the like, the device comprising essentially a pair of lateral frame members with depending portions and a pointed digger removably secured thereto, together with means for vertically adjusting the height of the digger and disc cutter means adapted to cut and remove the vines of the plants.

A primary object of this invention is to provide an implement which will cut the vines and cast them laterally of the row, and to raise the potatoes or peanuts out of the ground without unduly scattering the same and to thus facilitate the harvesting of the crop.

It is another object of this invention to provide a machine of this character in which the pointed digger member is replaceable and removably secured to a frog, this frog being protected from contact with the ground and, therefore, not readily worn out, this structure being designed to considerably simplify the manufacture of the machine.

Another object of this invention is to provide a digger which will be pivotally secured to the tractor hitch, allowing vertical adjustment of the machine, brackets being provided on the frame members to facilitate this vertical adjustment.

Another object of this invention is to provide laterally disposed disc cutters which are vertically and radially adjustable, this radial or angular adjustment of the disc cutters having been found to greatly increase the effectiveness of the machine in cutting the vines and casting the same laterally.

Another object of this invention is to provide a roller which is adapted to break up the clumps of earth behind the digger, thus making the potatoes or peanuts more readily accessible for the gathering thereof.

And a last object to be specifically mentioned is to provide an implement of this character which is relatively inexpensive and practicable to manufacture, extremely simple and convenient to use and adjust, and which will give generally efficient and durable service.

With these and other objects definitely in view, this invention resides in certain novel features of construction, combination and arrangement of parts and portions as will be hereinafter described in detail and particularly set forth in the appended claims, reference being had to the accompanying drawings which form a material part of this application, and in which:

Figure 2 is a side elevational view of the machine;

Figure 5 is a perspective view of the pointed digger;

Figure 6 is a similar view of the frog which is used to removably support the digger represented in Fig. 5, and Figure 7 is a top plan view of a portion of one of the lateral frame members, the view being taken on the line 7—7 of Figure 2.

Similar characters of reference designate similar or identical parts and portions throughout the specification and throughout the several views of the drawings.

Figures 1, 3, 4:
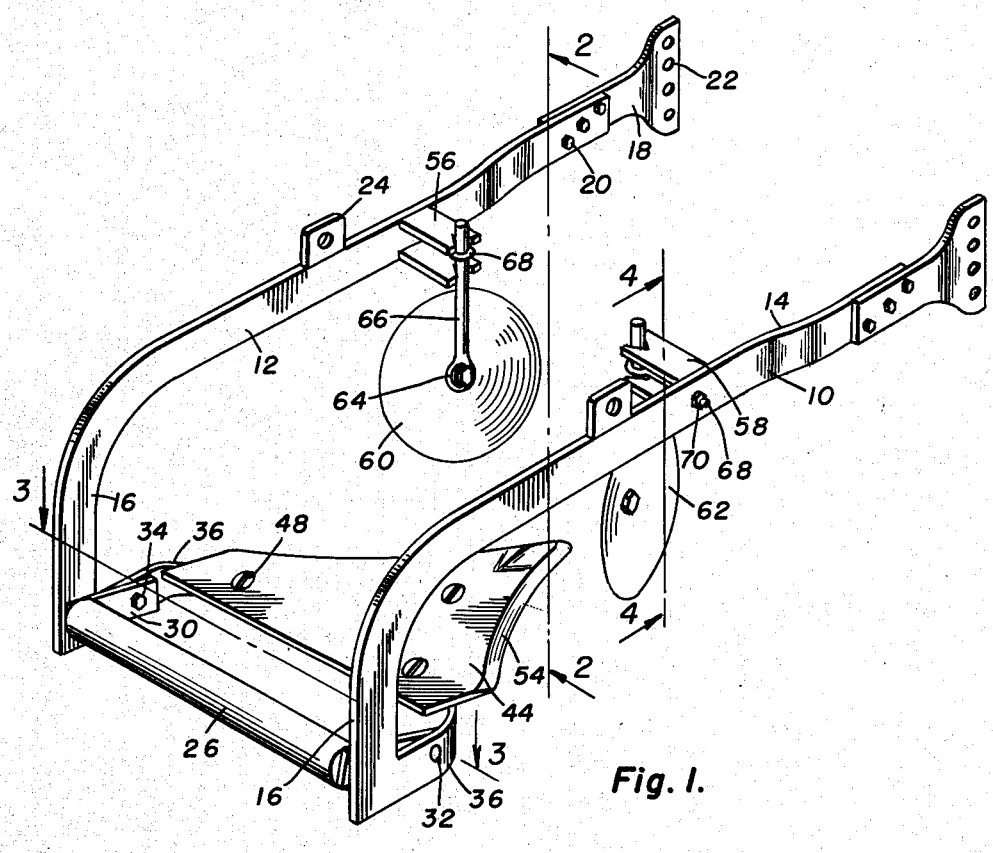
Figure 1 is a perspective view of the assembled machine.
Figure 3 is a fragmentary detail view of the roller, the view being largely in plan and taken on the line 3—3 in Figure 1.
Figure 4 is a vertical sectional view taken on the line 4—4 in Figure 1, a portion of the disc being broken away.

Referring now to the drawings in detail, it will be noted that the embodiment of this invention illustrated includes two similar frame members 10 and 12, which are preferably constructed of rectangular bar stock, inwardly bent as at 14 adjacent the forward ends thereof, and having downwardly depending portions 16 at the other ends thereof. These frame members 10 and 12 are parallel and adapted to be horizontally disposed, as indicated in the drawings.

For the purpose of securement of the machine to a tractor, there are provided tractor hitch members 18, rigidly secured to the forward ends of the members 10 and 12 by means of rivets or bolts 20, and having a plurality of apertures 22 arranged in vertically spaced relation, to facilitate the vertically adjustable securement of the machine to the tractor. Intermediate the ends of the members 10 and 12, there is provided a pair of brackets or apertured flanges 24, for the securement of cables to the frame members, it being understood that the other ends of these cables will be secured to hoisting means on the tractor and the tensioning of these cables will result in the raising of the rear portions of the machine.

When the machine is in use, however, the major portion of the weight of the machine will be carried by the roller 26 which is provided with an axle 28 terminally mounted in arm members 30. These arm members are of equal length and disposed on either end of the roller and adjustably mounted by means of bolts 32 and nuts 34, on the forwardly extending portions 36 which may be integral with the depending portions 16 of the frame members. This construction allows the adjustment of the roller 26 to raise and lower the rear portion of the machine, since this roller will normally contact the ground while the machine is in use.

The forwardly extending portions 36 will be preferably tapered as indicated in Figure 2 at 38, and are integrally secured to the generally rectangular frog plate 40. This frog plate 40 is substantially parallel to the forwardly extending portions 36 and is apertured at a plurality of points 42. A pointed digger 44 is similarly apertured, as at 46, and is generally triangular and adapted to fit onto the top of the frog plate 40, and to be secured thereto by a plurality of bolts 48 inserted through the apertures 42 and 46. The portion 50 of this digger 44, adjacent the point 52 thereof is transversely arcuate, as indicated in Figure 2 and the two sides of the digger are beveled as at 54.

Intermediate the ends of the frame members 10 and 12, double contact bracket members 56 and 58 are provided for the adjustable mounting of the disc cutters 60 and 62. These disc cutters are freely rotatably mounted, as generally indicated at 64, to the lower ends of a pair of similar cylindrical bars 66, the upper ends of which are adjustably secured in the double contact brackets 56 and 58, eyebolts 68 being associated with these members 66 and adapted to clamp the members 66 against the said brackets and being tightenable in position by the nuts 70 on the threaded ends of the eyebolts projecting through the members 10 and 12. These discs are concavo-convex and have sharpened edges, to cut the vines of the plants.

The operation of this invention will be clearly understood from a consideration of the foregoing description of the mechanical details thereof, taken in connection with the above recitation of the objects sought to be achieved by this invention but, in recapitulation, it may be noted that the machine may be lifted and lowered by cables secured to the members 24, and also adjusted by the pivotal adjustment of the roller 26. It will also now be more clearly understood how the pointed digger member 44 is made easily replaceable, by simply loosening the bolts 48, whereupon the digger may be removed from the frog plate 40, for repair, sharpening or replacement. It will also be understood how the improved means of mounting the discs 60 and 62 facilitates the adjustment of these discs both vertically and radially or angularly, to adapt the machine for use with different crops and for different conditions of operation.

Obviously, many useful modifications in the form and proportioning of the various elements of this invention may be made without departure from the scope and spirit of this invention, and though there has been described a particular embodiment of this invention, this application is not limited to this particular embodiment, but it is desired to include in the scope of this invention the construction, combination and arrangement of parts and portions substantially as set forth in the appended claims.

Having thus described this invention what I claim as new and desired to be secured by Letters Patent is:

1. A potato digging machine comprising a pair of lateral frame members having horizontally disposed portions with tractor hitch means at the forward ends thereof and depending portions at the rear ends thereof, forwardly extending members on the lower ends of said depending portions, a frog rigidly secured on said forwardly extending members, a pointed digger removably secured on said frog, said hitch allowing the machine to pivot vertically, a pair of oppositely disposed arm members pivotally adjustably mounted on said forwardly extending members, and an adjustable ground contacting roller secured to and between said arm members, whereby said digger may be raised and lowered relative to the surface of the ground.

2. A potato digging machine comprising a pair of lateral frame members having horizontally disposed portions with tractor hitch means at the forward ends thereof and depending portions at the rear ends thereof, forwardly extending members on the lower ends of said depending portions, a frog rigidly secured on said forwardly extending members, a pointed digger removably secured on said frog, said lateral frame members having oppositely disposed pairs of vertically spaced brackets intermediate the ends thereof and extending inwardly therefrom, freely rotatable disc cutters carried by vertical cylindrical bars, and eyebolts adjustably mounted on said lateral frame members between each pair of said brackets and with the eyes of the eyebolts receiving said bars, whereby the bars are vertically and rotatably adjustably secured to said brackets.

JOHN R. HOBBS.

REFERENCES CITED

The following references are of record in the file of this patent:

UNITED STATES PATENTS

| Number | Name | Date |
|---|---|---|
| 478,442 | Livingston | July 5, 1892 |
| 573,798 | Shearer | Dec. 22, 1896 |
| 914,232 | Bourland | Mar. 2, 1909 |
| 1,131,850 | Mayhall | Mar. 16, 1915 |
| 1,269,550 | Beasley | June 11, 1918 |
| 1,558,070 | Wirsching | Oct. 20, 1925 |
| 1,651,673 | Clary | Dec. 6, 1927 |